United States Patent [19]

Dole et al.

[11] Patent Number: 5,758,907
[45] Date of Patent: Jun. 2, 1998

[54] MIS-ADJUSTMENT LIMITING SEGMENTED PIPE COUPLING

[75] Inventors: Douglas R. Dole, Whitehouse Station, N.J.; Peter George DeRaymond, Nazareth, Pa.

[73] Assignee: Victaulic Company of America, Easton, Pa.

[21] Appl. No.: 687,732

[22] Filed: Jul. 26, 1996

[51] Int. Cl.⁶ .................................................. F16L 17/02
[52] U.S. Cl. .......................... 285/112; 285/328; 285/373
[58] Field of Search ............................ 285/112, 367, 285/410, 373, 419, 328; 24/279

[56] References Cited

U.S. PATENT DOCUMENTS

| | | | |
|---|---|---|---|
| 4,611,839 | 9/1986 | Rung et al. | 285/367 |
| 4,639,020 | 1/1987 | Rung et al. | 285/367 |
| 4,861,075 | 8/1989 | Pepi | 285/112 |
| 4,896,902 | 1/1990 | Weston | 285/112 X |
| 5,246,257 | 9/1993 | Kojima et al. | 285/112 |

*Primary Examiner*—Dave W. Arola
*Attorney, Agent, or Firm*—Abelman, Frayne & Schwab

[57] ABSTRACT

Coupling segments having angled end faces are provided with stop members at their respective ends which prevent mis-alignment of the coupling segments during their assembly onto the adjacent ends of pipes or fittings. The stop member being crushed down during final tightening of the coupling to permit further limited lateral movement of the ends of the coupling segment, thus to provide a truly ridged coupling in which angling of the axes of the respective pipes or fittings is eliminated.

7 Claims, 6 Drawing Sheets

MIS-ADJUSTMENT LIMITING SEGMENTED PIPE COUPLING

FIELD OF THE INVENTION

This invention relates to segmented pipe couplings incorporating coupling segments that are capable of lateral movement relative to each other during tightening down of the coupling. In such couplings the mutually presented end faces of the coupling segments move oppositely relative to the longitudinal axis of the pipe or fitting to which they are applied, in order to cause keys on the respective coupling segments to engage opposite side walls of grooves cut or otherwise formed in the external circumference of the pipe or fitting.

Segmented pipe couplings commonly include two coupling segments for pipe sizes of 12" or less.

For larger sizes of pipe diameters, three or more coupling segments are employed, more commonly, four or more such coupling segments.

In the event that the coupling is comprised of two coupling segments, the respective coupling segments are applied to the pipe exterior, then, a traction bolt is passed through the adjacent bolting pads at one side of the coupling. A nut is then applied to the traction bolt, and, more commonly, the nut is torqued down to retain the coupling segments attached to the pipe, subsequent to which a traction bolt is inserted through adjacent bolting pads at the opposite ends of the coupling segments, and a nut is applied and is torqued down.

There is, however, a possibility that a careless or insufficiently instructed workman will fully torque down the first traction bolt to maximum torque prior to torquing down of the other traction bolt.

This can result in a mis-adjustment of the pipe coupling, which will result in less than optimum securement of the pipe coupling to the associated pipes or fittings.

In the event that the first applied traction bolt is torqued down employing a common wrench (and it is to be expected that an workman probably will use a common wrench instead of a torque limiting wrench), this can result in the keys of the coupling segments biting into the side walls in the pipes. This, in turn, will result in a greater than desired opposite lateral movement of the ends of the respective coupling segments, at one end of the coupling prior to the torquing down of the traction bolt. At the opposite ends of the coupling segments.

In the event that the first end of the coupling segments is overly tightened down to an extent that the keys bite into the side walls of the grooves, this will result in the respective coupling segments rotating relative to each other circumferentially of the pipe periphery, with a consequence that upon tightening down of the traction bolt at the opposite ends of the coupling segments, the end faces of the coupling segments possibly will not engage, and, the keys possibly will not engage the side faces of the grooves, in turn negating the clamping engagement therewith.

If this should happen, the ability of coupling to provide a truly rigid pipe coupling is compromised i.e., while the keys properly are engaged with the side wall of the grooves at one end of the coupling segments, and the keys at the center of the coupling segments properly are engaged with the bottom wall of the groove, there still exists a spacing between the keys and the side walls of the grooves at the opposite ends of the coupling segments. This can permit angling movement of the pipes of fittings relative to each other, instead of them being held immovably with their respective longitudinal axes in alignment.

A similar problem occurs when applying a coupling segments to pipes in excess of 12" diameter, which, for economy in casting, dimensional accuracy, and convenience in handling of the relatively heavy coupling segments requires the employment of more than two coupling segments.

If, for example, the coupling is to be comprised of three coupling segments, then, due to the fact that the respective coupling segments each must subtend an angle of 120°, it is necessary for the first coupling segment to be applied to the pipe, the second coupling segment then to be applied to the pipe with its end face in abutting relation with the first coupling segment, and, a traction bolt applied at that point. This procedure has to be adopted in that the two coupling segments themselves subtend an arc of 240°, which precludes there being preassembled to each other and then passed over the pipe periphery.

When employing four or more coupling segments, a pair of the coupling segments can be preassembled to each other prior to their application to the pipe periphery, and then the other pair of preassembled coupling segments applied to the pipe periphery, and then be secured to the first pair of preassembled coupling segments by the use of traction bolts.

These procedures, however, result in a multiplication of the possible sources of mis-adjustment of the coupling segments and of the resulting coupling, even further exaggerating the problems encountered in segmented pipe couplings employing only two coupling segments.

BACKGROUND OF THE INVENTION

Segmented pipe couplings of the type referred to are known from Rung, U.S. Pat. No. 4,611,839, assigned to the common Assignee in the present invention, and which teaches segmented pipe couplings having the ability of providing a rigid pipe coupling, the coupling being comprised of coupling segments having end faces that are inclined relative to the longitudinal axis of the coupling segments. The respective coupling segments, when tightened down onto the pipes or fittings, are capable of moving axially relative to each other in opposite directions at their respective ends in order to produce the required engagement of the keys of the respective coupling segments with the opposite side walls of the grooves provided in the pipes or fittings.

This, however, does not preclude mis-adjustment of the ends of the respective coupling segments, which are free to move oppositely relative to each other prior to the application of the coupling segments to the pipes, until they are precluded from further such movement by the engagement of the keys with the side wall of the pipe grooves. If the clamping force provided by the traction bolt is sufficient, then, crushing down of the side walls of the keys can occur, as can cold-working of the side walls of the pipe grooves, producing indentations in the side walls of the pipe grooves, and in turn, permitting a further minor extent of movement of the ends of the coupling segments relative to each other.

DESCRIPTION OF THE PRESENT INVENTION

It is an object of the present invention to preserve all of the desirable characteristics of the known self-adjusting segmented pipe coupling, while at the same time precluding the possibility or mis-adjustment of the respective coupling segments prior to final tightening down of the segmented pipe coupling, by limiting the extent to which the coupling segments can move laterally relatively to each other at their ends.

While this ability is of considerable advantage in pipe couplings comprised of dual coupling segments, it is of even greater advantage in segmented pipe couplings, comprised of more than two coupling segments.

In the event that the coupling is comprised of three or more coupling segments, then, it further reduces the possibility of additive mis-adjustments of the coupling segments during assembly of the coupling.

If the segmented coupling is comprised of four or more coupling segments, then, the opportunity exists of preassembling pairs of the coupling segments one to the other prior to their application to circumference of the pipes or fittings, in a manner that will provide positional stability of the respective coupling segments relative to each other prior to their being applied to the periphery of the pipes of fittings.

By providing a stable interconnection between the coupling segments, handling of the respective pairs of interconnected coupling segments prior to their application to the periphery of the pipes of fittings is greatly facilitated, the respective interconnected pairs then being handlable in the same manner as a single coupling segment having the same arcuate extent.

SUMMARY OF THE INVENTION

According to the present invention, stop members are provided at the respective ends of the coupling segments that are engageable by corresponding stop members on the next adjacent coupling segment, and which limit the initial extent to which the ends of the respective coupling segments can move laterally oppositely relatively to each other.

The respective stop members are either machined at one end only, or are unmachined and in their form "as cast," thus to present to each other surfaces that are rough and crushable, and which are comprised of a pebbled surface simulating orange peel.

The initial engagement of the surfaces provides an initial limitation on the extent to which the ends of the respective coupling segments can move laterally relative to each other, i.e., provides an initial setting for the coupling segments that is employed during assembly of the coupling.

Subsequent to assembly of the completed coupling, the traction bolts are then torqued down to an extent sufficient to cause crushing down of the as-cast surfaces, this enabling a further minor extent of movement of the respective coupling segments relative to each other, in order to then permit the respective keys to move into fully seated engagement with the side walls of the grooves. The clamping force exerted by the respective keys is thus substantially equalized in force per unit area, while at the same time any movements of the coupling segments circumferentially of the pipes or fittings also is substantially equalized, thus to ensure that forces exerted by the coupling are substantially equalized throughout the entire circumferential extent of the coupling.

A great advantage of this improvement is that the assembly of two or more coupling segments to each other prior to their application to the periphery of the pipes or fittings is facilitated, the compressive engagement of the respective stop members with the oppositely presented stop members then stabilizing the sub-assembly and enabling it to be handled as a single unit.

While a single stop member on each of the ends of the respective coupling segments is sufficient to provide for the limitation of the extent of relative movement between the ends of the coupling segments, preferably, dual such stop members are provided on the ends of the respective coupling segments arranged respectively on opposite sides of the coupling segments, thus to ensure correct alignment of the respective coupling segments relative to each other with the longitudinal axis of the respective coupling segments coincident with the longitudinal axis of the next adjacent coupling segment.

DESCRIPTION OF THE DRAWINGS

The invention will be more readily understood from a reading of the following specification and by reference to the following drawings forming a part thereof, and wherein:

FIG. 8 is a side view of one of the coupling segments illustrated in FIGS. 6 and 7;

FIG. 9 is a cross-section taken on the line 9—9 in FIG. 8;

DESCRIPTION OF THE PREFERRED EMBODIMENTS

Figure 1:
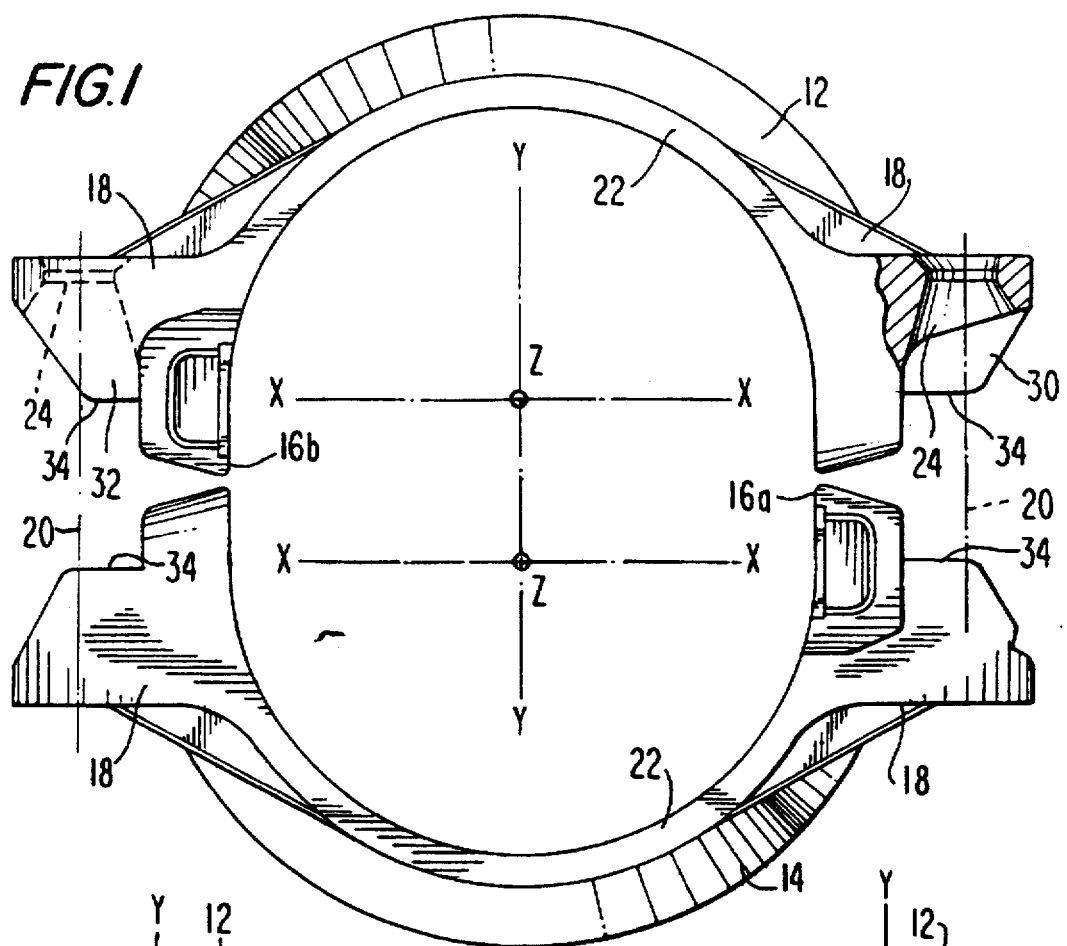
FIG. 1 is an exploded view of a coupling, such as taught in Rung, U.S. Pat. No. 4,611,839, when modified in accordance with the teachings of the present invention.
Figure 2:
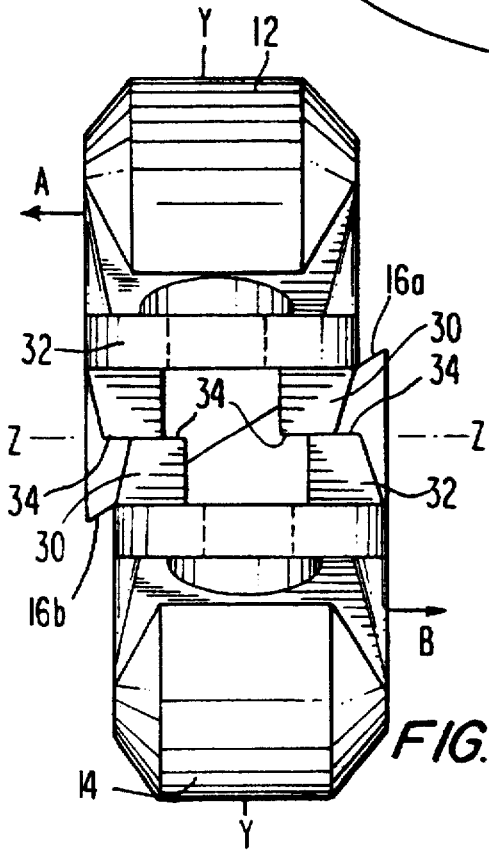
FIG. 2 is a side view of a coupling assembled from the coupling segments shown in FIG. 1, and which incorporate the teachings of the present invention.
Figure 3:
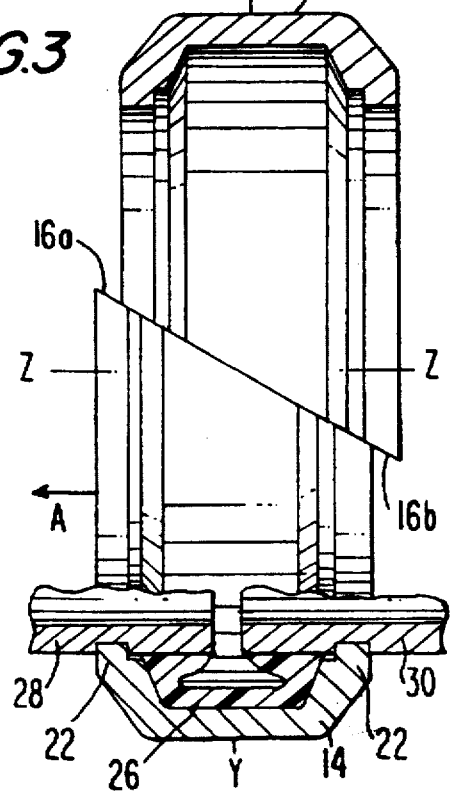
FIG. 3 is a longitudinal cross-section through FIG. 2, more clearly illustrating the inner construction of the respective coupling segments.

Reference is firstly made to FIGS. 1–3, which illustrate a basic segmented coupling of the type taught by Rung, U.S. Pat. No. 4,611,839, when modified to include the improvements of the present invention.

The coupling is comprised of two identical coupling segments 12 and 14, that are to be moved towards each other in the direction of the Y—Y axis, movement in that direction being produced by traction bolts (not illustrated) that are passed through bolting pads 18 of the respective coupling segments, and which are operative to draw the respective coupling segments 12 and 14 in the direction of Y—Y axis, and into engagement with each other, the longitudinal axis of the respective traction bolts being indicated at 20.

The respective end faces 16a and 16b of the respective coupling segments each extend in a direction longitudinal to the Z—Z axis, and are inclined oppositely relative to the X-Z plane.

Thus, upon movement of the coupling segments 12 and 14 towards each other along the Y—Y axis, the respective end faces 16a and 16b are brought into engagement with one another, further movement of the coupling segments towards each other along the Y—Y axis then resulting in the respective coupling segments being rotated oppositely about the Y—Y axis, in this manner permitting a reduction of the effective inner circumference of the coupling defined by keys 22—22 of the respective coupling segments 12–14.

The respective traction bolts 20—20 are passed through apertures 24—24 provided in the respective bolting pads 18, the apertures 24 being appropriately configured to permit such relative lateral movement of the ends of the coupling segments in the direction of the Z—Z axis.

Up to this point, the construction of the coupling segments and their mode of operation is that disclosed in Rung, U.S. Pat. No. 4,661,839. During tightening down of the coupling the internal circumferential extent of the coupling is reduced such that the keys 22 each bottom down onto a bottom wall of the grooves in the associated pipes or fittings, while the respective coupling segments 12 and 14 rotate oppositely to each other about the Y—Y axis in order to bring the keys 22 into clamping contact with the oppositely facing side walls of the grooves.

Referring now to FIG. 2, it will be seen that one end of the coupling segment 12 will be moving in the direction of the arrow A, while the corresponding end of the coupling segment 14 will be moving in the direction of the arrow B.

Referring now to FIG. 3, it will be seen that the opposite end of the coupling segment 12 is moving in the direction of the arrow B, while the opposite end of the coupling segment 14 is moving in the direction of the arrow A.

In the absence of a structure limiting the extent of movement of the respective ends of the coupling segments 12 and 14 in the directions of the arrows A and B, then, the respective ends of the coupling segments can in fact move to random extents in the directions of the respective arrows A and B, unless constrained against further such movement.

As illustrated in FIG. 3, the respective coupling segments surround a sealing gasket 26 that is positioned over the ends of the pipes 28 and 30, and which is forced into sealing engagement with the pipe ends during the tightening down of the coupling.

Provided that the tightening down of the coupling is effected by a trained and fully instructed workman, then, it is to be expected that the respective ends of the coupling segments will be moved oppositely to each other to approximately identical extent, thus to produce a symmetrical alignment of the coupling segments during the tightening down of the coupling.

If, however, that operation is performed by an unskilled or uninformed workman, the probability is that, purely for his own convenience, the workman will fully tighten down one of the traction bolts, thus to secure the coupling segments on to the pipe periphery, at which point both of his hands are free for the assembly traction bolt in to the opposite end of the coupling segments.

However, by following that procedure the probability is that the traction bolt that is first torqued down will be overly torqued and, will have caused the keys on the coupling segments at that end of the coupling segments to have "over-shot", and in the process, to have become embedded in the side walls of the pipe grooves.

If that condition occurs, then, the bolting pads at that end of the coupling will have been drawn more closely into proximity with each other, which in turn will have resulted in the respective coupling segments rotating about the periphery of the pipe and angularly relative to the Z—Z axis. As a result, the coupling segments become mis-adjusted, the respective bolting pads at the opposite ends of the respective coupling segments then having been inclined relative to the X-Z plane. This condition will remain during the final assembly of the coupling, in that the traction bolt itself is highly resistive to elongation, such as would be required in order to permit the respective bolting pads to move reversely into true parallelism with the X-Z plane.

Having arrived at this condition of mis-adjustment, then, when the traction bolt is inserted and tightened down in the opposite ends of the coupling, there firstly is possibility that the respective keys cannot approach the side walls of the grooves and produce a clamping force, or, in the event that the keys do engage the side walls of the grooves sufficiently to produce a clamping force, they cannot produce a clamping force corresponding in magnitude with that produced by the keys at the opposite ends of the coupling segments. Secondly, there is a possibly that the end faces of the respective coupling segments will be in a position spaced one from the other, in which event there will be no force available to move the keys into clamping engagement with the side walls of the groove at that end of the coupling segments.

Also, there is a possibility that the longitudinal axis of the respective pipes have been forced out of axial alignment with one another.

DESCRIPTION OF IMPROVED CONSTRUCTION

The improvement of the present invention addresses this problem, and, has been found to reduce the possibility of mis-adjustment of the respective coupling segments to an extent such that assembly of the coupling can be entrusted to a relatively unskilled and uninformed workman, with an assurity that the finally assembled pipe coupling is correctly adjusted, and, that the clamping forces exerted on the respective pipes are uniform at all positions diametrically of the coupling.

Instead of providing end faces on the respective coupling segments that are capable of random movement relative to each other in the direction of the Z—Z axis, the present invention employs stop members 30 and 32 on each of the opposite sides of the bolting pads, the mutually presented faces 34 of the respective stop members optionally lying in the X-Z plane of the coupling segment, as shown in FIG. 2.

The stop members 30 and 32 are spaced radially outwardly of the end faces 16a, 16b, and are intentionally left in their "as-cast" condition, in order that the juxtaposed end faces 34 of the respective stop members each are rough in finish, and have a crushable pebbled surface simulating that of orange peel, that surface being a direct consequence of the casting operation.

Thus, when the respective coupling segments are assembled to each other, without regard to whether a single traction bolt is torqued down at one end of the coupling segments before the torquing down of the traction bolt at the other ends of the coupling segments, movement of the coupling segments along the Y—Y axis towards each other can only continue until such time as the mutually presented end surfaces 34 of the respective stop members 30 and 32 contact each other. At that time it is then assured that the bolting pads each extended parallel to the X-Z plane, and, that they are in the correct position of adjustment preparatory to final tightening down of the coupling.

During final tightening down of the coupling, the relatively rough and unfinished mutually presented end faces 34 of the stop members 30 and 32 crush-down to a minor extent. The resistance to crushing-down progressively increases as the traction bolts are further torqued down, with the consequence that increased torquing down of the traction bolts encounters a progressive decrease in the extent of further opposite movement of the end faces of the coupling segments relative to each other.

The effects of this progressively increasing restraint against relative movement of the ends of the coupling segments culminates in the entirely beneficial effect of insuring that the clamping forces exerted by the coupling are very closely approximate to each other on opposite points on any diameter of the coupling.

In FIG. 2, the mutually presented faces 34 of the stop members 30 and 32 are shown as extending in the X-Z plane of the respective coupling segments, and, thus in the X-Z plane of the assembled coupling.

This positioning of the end faces 34 in the X-Z plane of the coupling is not the essential consideration, the essential consideration being that of limiting movement of the respective coupling segments 12 and 14 towards each other in the direction of the Y—Y axis prior to final tightening down of the coupling.

This positional relationship of the respective ends of the coupling segments can be obtained by alternative forms of stop members 30 and 32, as is now described with reference to FIGS. 2A through 2D.

Figure 2A:
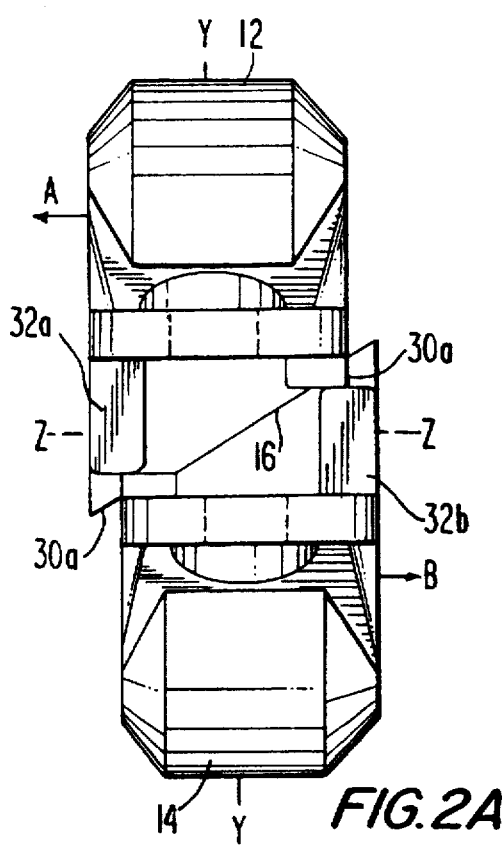
FIGS. 2A–2D correspond with FIG. 2, and illustrate alternative constructions incorporating the teachings of the present invention.

In FIG. 2A, the stop members 30a have been made of less height, and, the stop members 32a have been made of increased height, the combined height of the stop members 30a and 32a determining the extent to which the ends of the coupling segments 12 and 14 can move towards each other in the direction of the Y—Y axis, this in turn limiting the extent to which the ends of the respective coupling segments can move oppositely to each other in the directions of the arrows A and B.

Figure 2B:
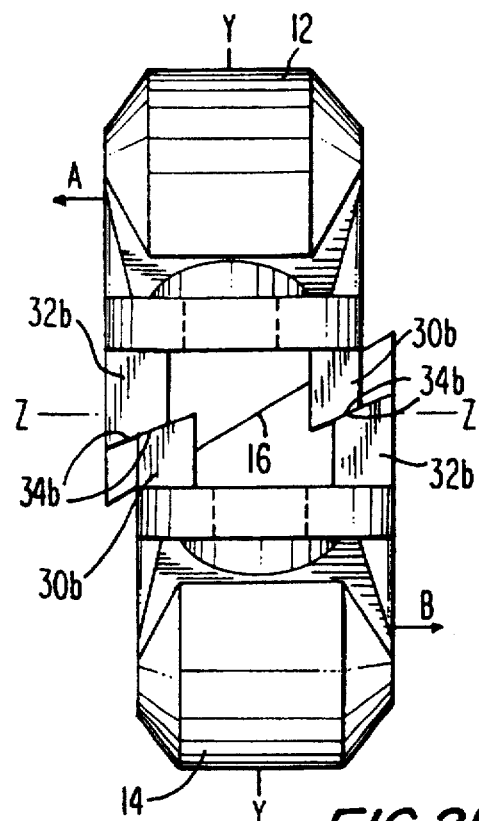

In FIG. 2B, the respective stop members 30b and 32b, instead of having end faces that extend parallel to the X-Z plane, have end faces 34b that are each inclined relative to the X-Z plane, but, at an angle less than the inclination of the end faces 16a, 16b of the coupling segment relative to the X-Z plane.

By angling the end faces 34b of the respective stop members 30b and 32b in this manner, a minor sliding movement of the end faces 34b relative to each other will occur, which permits abrasive attrition of the respective end faces 34b, and further assists in the crushing down of those end faces 34 during the tightening down of the coupling.

Figure 2C:
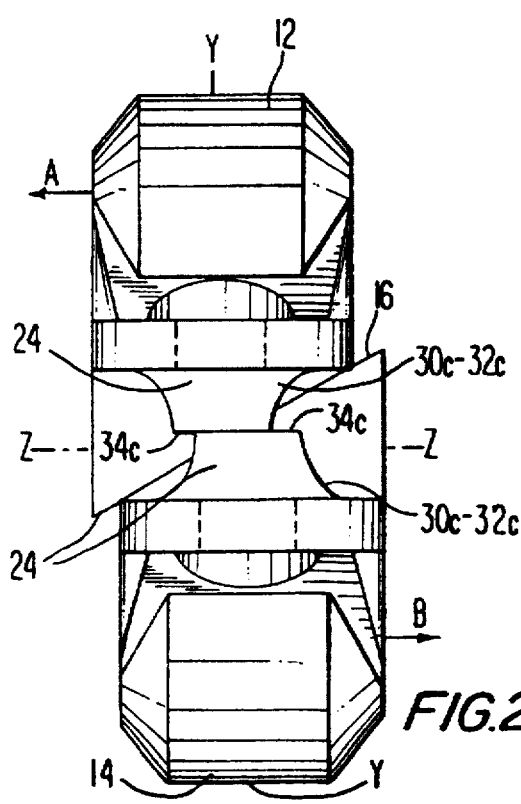

In FIG. 2C, the stop members 30c and 32c are positioned inwardly of the opposite sides of the respective coupling segments, and, are positioned in surrounding relationship with the bolt holes 24, thus to provide guides permitting ready insertion of the traction bolts 20. In FIG. 2C, the end faces 34C of the respective stop members 30c–32c are shown extending parallel to the X-Z plane. Equally well they could be inclined relative to the X-Z plane in the manner discussed above with respect to FIG. 2B.

Figure 2D:
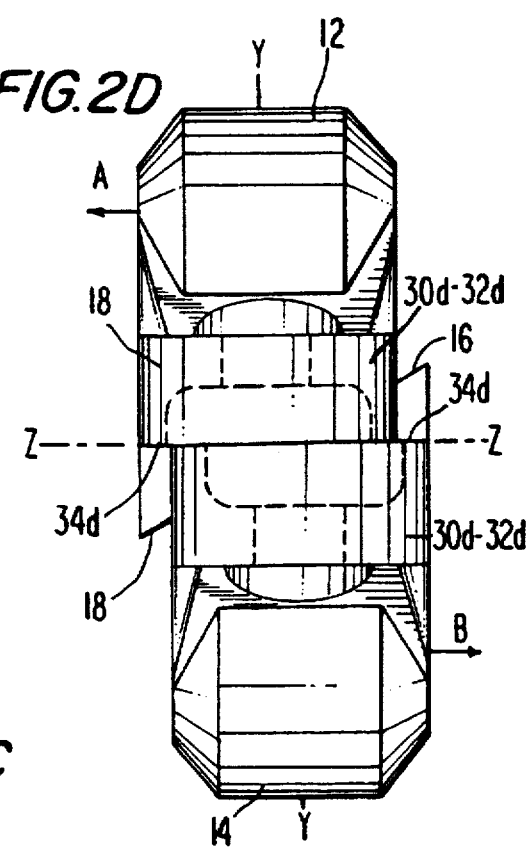

In FIG. 2D, the bolting pads 18 are extended downwardly, thus to present a shroud or skirt extending around the traction bolts. Either the end faces 34d of the respective bolting pads 18 can be arranged for them to be positioned in the X-Z plane, or, they can be appropriately inclined as discussed with respect to FIG. 2B.

Other configurations of stop members will suggest themselves to persons skilled in the art, for example, inter-fitting tongue and groove arrangements that provided the same capability of limiting the initial movement of the coupling segments 12 and 14 towards each other along the Y—Y axis, and then permitting restricted further movement in the direction of the Y—Y axis by crushing down of the interengaged surfaces of the respective stop members.

The extent of mis-adjustment of the coupling segments in the known construction of segmented pipe couplings becomes additive. For example, in the event that the coupling employs three coupling segments, the possibilities of mis-adjustment are doubled, in that a first extent of mis-adjustment occurs at the time the ends of two coupling segments are joined to each other by traction bolt, and a second extent of mis-adjustment occurs at the time the next two ends of the coupling segments are joined by a traction bolt, thus, doubling the extent of mis-alignment at the time the final traction bolt is inserted through the juxtaposed end of the first coupling segment and the mutually presented end of the third coupling segment.

The problem is still further exaggerated in the event that the coupling is comprised of four or more coupling segments, i.e., three times the extent of mis-adjustment can occur in a coupling comprised of four coupling segments, which will appear at the mutually presented ends of the first and fourth coupling segment, and, which may be of an extent sufficient to prevent the end faces of the respective first and fourth coupling segments from reaching actual face engagement with each other. In that event there will be no force generated that is operative to move the mutually presented ends of the first and fourth coupling segment in opposite directions relative to the Z—Z axis, which in turn will result in the keys failing to clamp onto the adjacent side walls of the pipe grooves, and, in turn will denigrate the ability of the coupling to produce a truly rigid coupling.

These effects can better be visualized by a consideration of FIGS. 4 and 5 of the drawings, which illustrate ends of coupling segments common to couplings comprised of any number of coupling segments, such is exemplified by the coupling formed of four such coupling segments as later discussed with respect to FIGS. 6–12.

Figure 4:
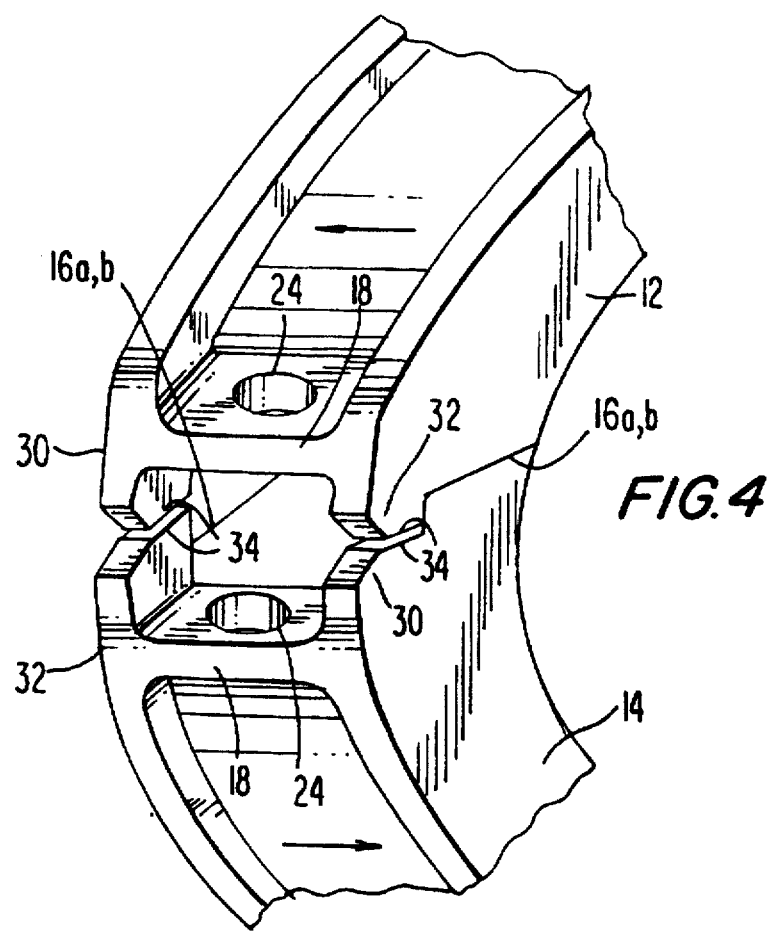
FIG. 4 is a perspective view showing the juxtaposed ends of a pair of coupling segments as shown in FIGS. 1–3 when in an initial condition of engagement of the end faces of the coupling segments.

FIG. 4 illustrates the ends of a pair of coupling segments in an initial position they can occupy prior to the torquing down of the traction bolt (not shown) to be inserted through the apertures 24 in the respective bolting pads 18.

At the time the coupling segments 12 and 14 initially are assembled onto each other, the coupling segments will be substantially in alignment in the X-Y plane, and, the end faces 16A and 16B will be engaged with one another.

In that condition, the end faces 34 of the respective stop members 30 and 32 will be spaced from one another, the spacing between the end faces 34 of the stop members 30 and 32 determining the extent to which the end faces of 16a and 16b can move oppositely relative to each other during torquing down of the traction bolt.

Figure 5:
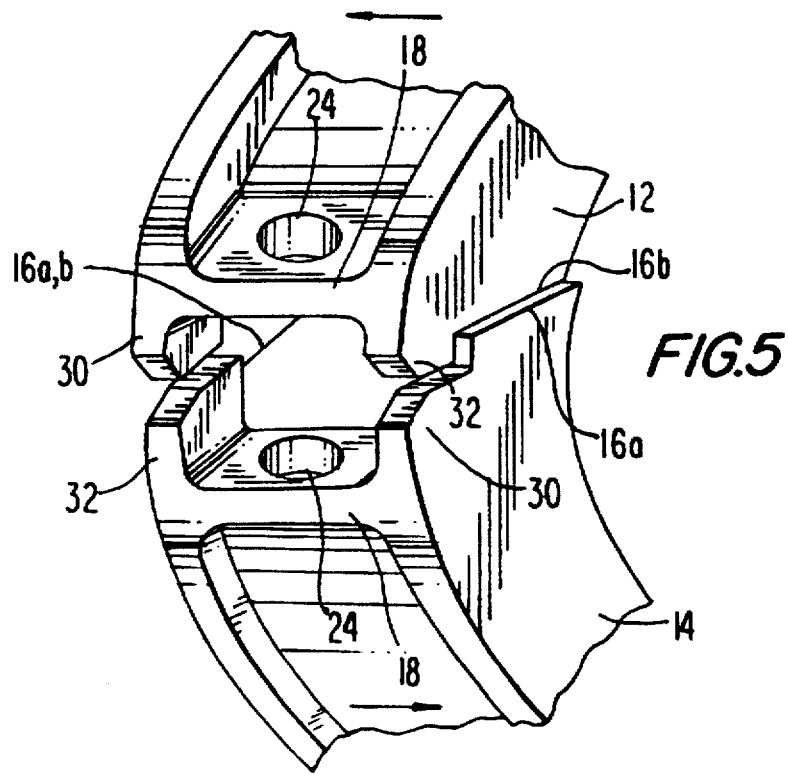
FIG. 5 is a view corresponding with FIG. 4, but showing the ends of the respective coupling segments in a condition of engagement in which the ends of the respective coupling segments have moved oppositely relative to each other.

Referring now to FIG. 5, regardless to which ones of the adjacent ends of the coupling segments is first tightened down, those ends of the coupling segments can only move laterally relative to each other by the extent permitted by the spacing of the juxtaposed end faces 34 of the respective coupling segments. Once the end faces 34 of the respective stop members 30 and 32 have engaged one another, a condition which will be manually sensed by the workman, further tightening down of those end faces is precluded until such time as the workman applies a torque to the traction bolt associated with those end faces that is sufficient to cause crushing-down of the rough and unfinished end faces 34. The crushing-down of the end faces 34 will, however, require a greatly and progressively increasing forces to be applied by the workman to the wrench employed for torquing down the traction bolt.

Unless the workman applies obviously excessive force in torquing down the traction bolt, the respective coupling segments will effectively stop in a first position of adjustment, the first position of adjustment being that which will negate mis-adjustment of the end faces of the respective coupling segments during final assembly of the coupling.

In the event that a coupling comprised of two coupling segments is employed, the operation is then repeated a the opposite ends of the coupling segments, subsequent to which the traction bolts are then fully torqued down in order to provide the crushing-down of the rough end faces 34 of the stop members 30 and 32. However, prior to commencement of that final operation, it is assured that the respective coupling segments are in a correct position of adjustment relative to each other, the correctness of the position of adjustment existing regardless of the number of coupling segments that are employed in the coupling.

Further advantages of the present invention become apparent in the event that the coupling is comprised of a multiplicity of coupling segments, for example, a coupling comprised of four coupling segments as now described with reference to FIGS. 6–12.

Figure 6:
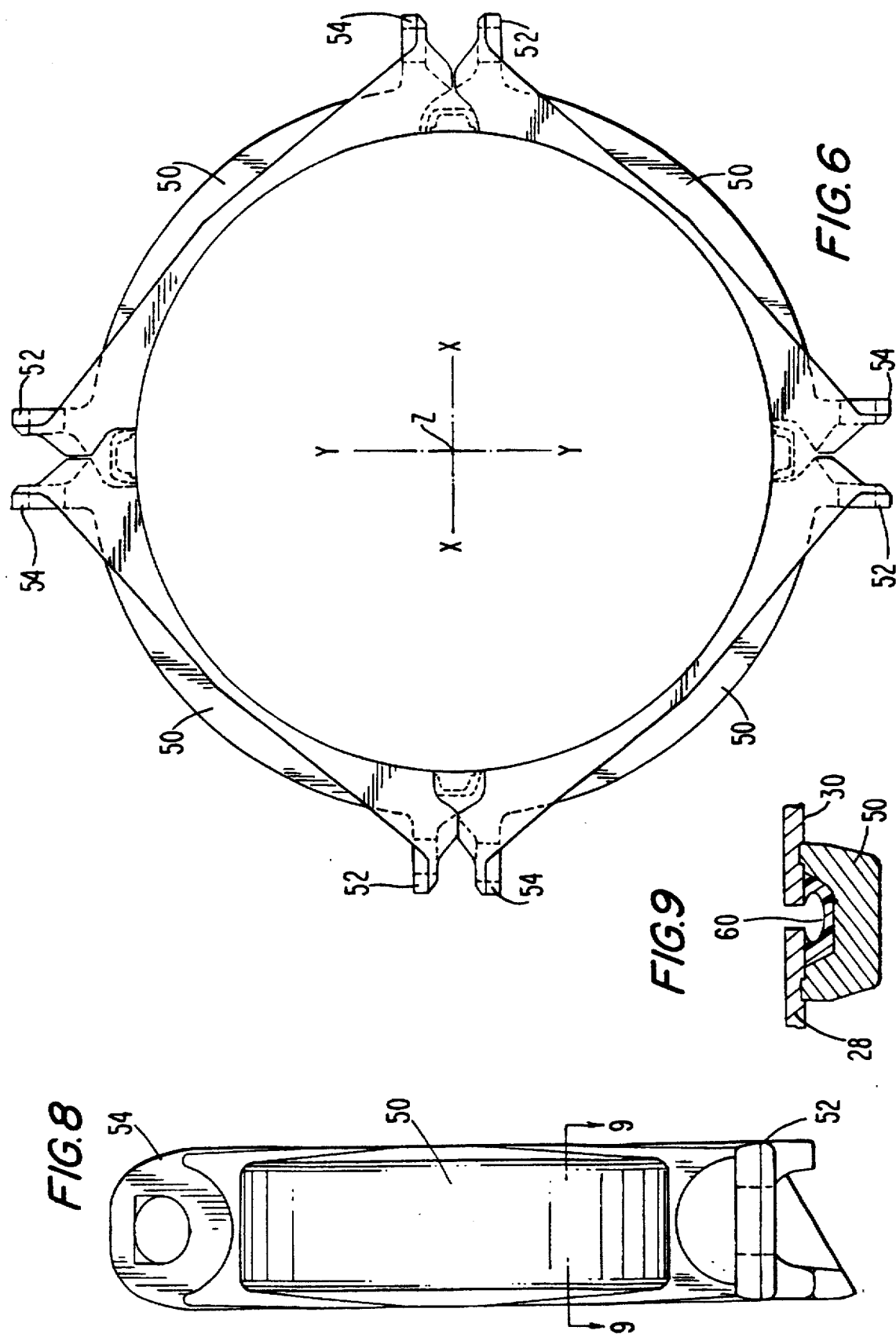
FIG. 6 illustrates a coupling comprised of four coupling segments, the respective coupling segments being similar in all respects with the coupling segments illustrated in FIG. 1, with the sole exception of the arcuate extent of the respective coupling segments.

Referring now to FIG. 6, the segmented coupling is comprised of four identical coupling segments 50, which have been interfitted one with the other, and which each subtend an arc of 90°. The respective coupling segments each include bolting pads 52, 54, and provide coupling segments that are truly a hermaphrodite with one another, and, which thus can be interfitted one with the other with either the bolting pad 52 presented to a bolting pad 54, or, which, if one of the coupling segments is rotated end to end then will reverse the respective ends 52 and 54 for the end 52 then to become an end 54 and the end 54 then to become an end 52.

Figure 7:
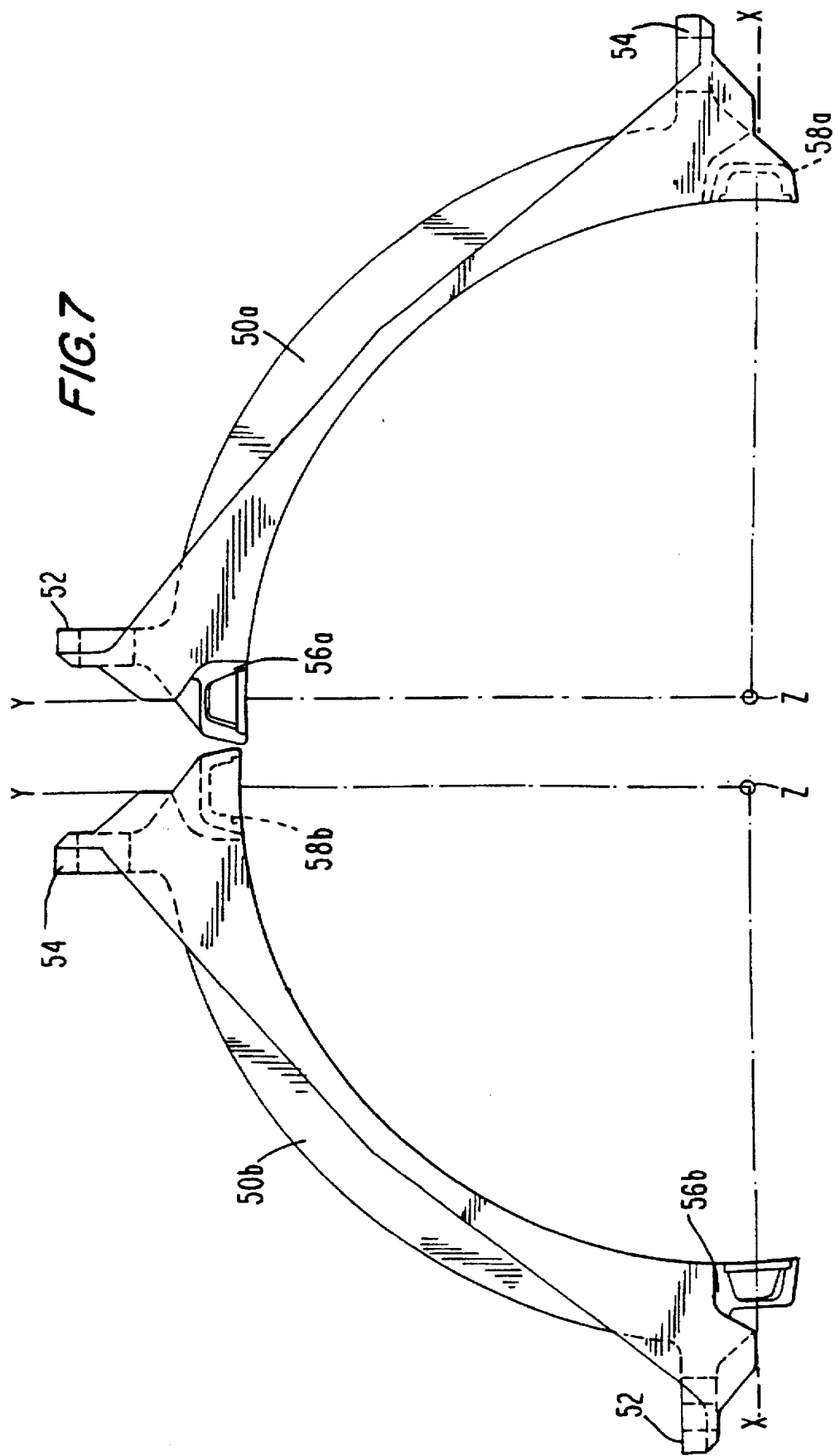
FIG. 7 is a view corresponding with FIG. 6, and showing two of the coupling segments prior to inter-fitting of those coupling segments.

This hermaphrodite arrangement is more clearly disclosed in FIG. 7, which shows two coupling segments 50 in the condition they occupy prior to assembly to each other and connection to each other by a traction bolt.

As will be seen, the end face 56a extends at an angle to the Y–Z plane, while the opposite end face 58a extends at an identical but opposite angle to the X–Z plane. If now the coupling segment is rotated through 180°, this will result in a reversal of the end faces 56a and 58a, the end face 58a then becoming the end face 56a and visa versa. Similarly the end faces 56b and 58b of the coupling segment 50b will reverse themselves when the coupling segment 50b is rotated 180° about the central radius of that coupling.

Provided that this asymmetrical arrangement of the respective ends of the respective coupling segments is maintained, then, any number of coupling segments can be employed in the fabrication of a segmented pipe coupling, the only difference between the couplings segments illustrated in FIGS. 6 and 7 being that the respective coupling segments will subtend an angle of less than 90° in the event that the coupling is comprised of more than four coupling segments, or, 120° in the event that the coupling is to be comprised of only three coupling segments.

In order to reduce to one of the number of workman needed, a first pair of coupling segments, of necessity, must be initially connected to each other by a traction bolt. The traction bolt in the case of coupling segments substanding an angle of less than 90° conveniently can be applied prior to the positioning of the first pair of coupling segments over the pipe periphery in straddling relation therewith, and in surrounding relation with the contained sealing gasket 60, as illustrated in FIG. 9.

The preassembly of two coupling segments, such as the coupling segments 50a and 50b of FIG. 7 conveniently can be effected by a workman prior to the application of those coupling segments to the pipe periphery. Alternatively, the workman can apply one of the coupling segments to the pipe periphery, then bring the other coupling segment into position, and secure the two coupling segments to each other by means of a traction bolt, and then continue with the progression up to completion of the segmented pipe coupling.

During the assembly of the pipe coupling, and as is now described with reference to FIGS. 10–12, by employing the teachings of the present invention over-shooting or over-off setting of the mutually presented ends of the respective coupling segments is avoided, thus enabling the keys of the respective coupling segments to be fitted into the pipe grooves. Further, by employing the teachings of the present invention, it is assured that the respective coupling segments upon initial tightening down of the traction bolts are properly positioned relative to each other relative to the X–Y plane.

Figures 10, 11, 12:
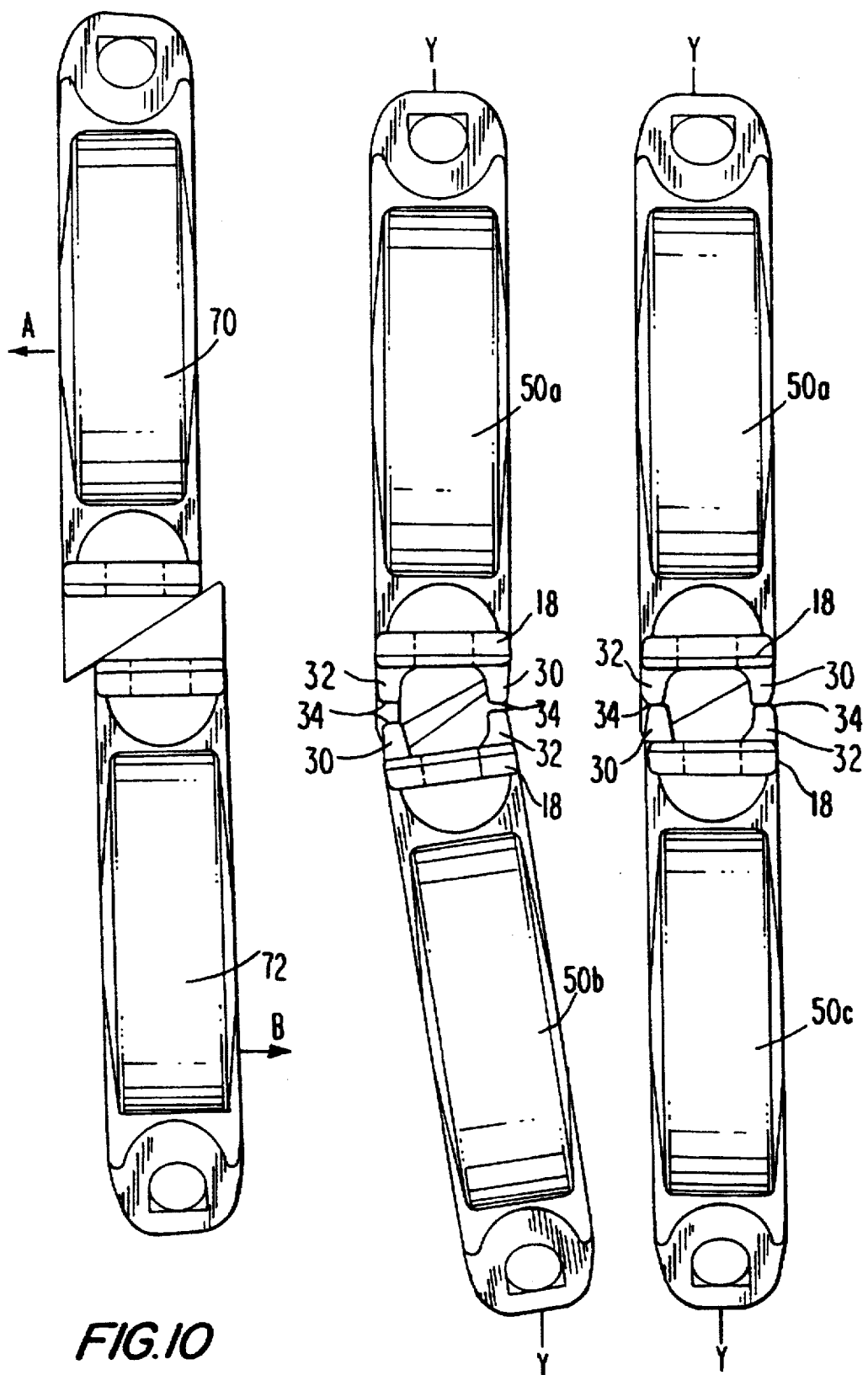
FIG. 10 illustrates the prior art manner of assembly of the respective coupling segments that do not include the improvement of the present invention.
FIGS. 11 and 12 are views corresponding with FIG. 10, but which include the improvement of the present invention, in order to illustrate the advantage of the improvement of the present invention.

Referring now to FIG. 10, a prior art couplings segment 70 is shown in mutually presented end face engagement with a further coupling segment 72 of the prior art.

As will be apparent, the coupling segment 70 is free to move in the direction of the arrow A, until it is further prevented from such movement by the engagement of the traction bolt with the side walls of the bore in the associated bolting pad. Similarly, the coupling segment 72 can move randomly in the direction of the arrow B. Further, the respective coupling segments 70 and 72 readily can move out of the X–Y plane by rotating about the axis of the traction bolt.

Referring now to FIGS. 11 and 12, which illustrate coupling segments incorporating the improvement of the present invention, when the coupling segment 50a is presented to the coupling segment 50b, at least one of the stop members 30 will contact the mutually presented stop member 32. If a traction bolt is then inserted through the respective bolting pads 18, then, the respective coupling segments 50a and 50b will hinge about the engaged pair of stop members 30 and 32 to bring the stop members 30 and 32 at the opposite sides of the coupling segments into engagement, and in so doing, bring the coupling segments 50a and 50b into parallelism with the X–Y plane.

Having reached that combination, the assembled pair of coupling segments readily can be applied to the pipe in the event that they have not initially been positioned on the pipe, the stop members 30 and 32 at that time insuring that the respective keys 22, 22 on the inner periphery of the respective coupling segments have not over-shot the side walls of the pipe groove, but are in fact, positioned at a distance slightly less that the distance between the side walls of the pipe grooves.

Having assembled a first pair of coupling segments onto the pipe periphery, then, a third coupling segment can be added and be initially secured by a traction bolt, and, the foregoing steps be repeated by a single workman up to completion of the entire segmented pipe coupling.

As over-shooting of the mutually presented ends of the respective coupling segments is eliminated, additive progressive mis-alignments of the coupling segments is eliminated, with the result that the mutually presented faces of the first and last coupling segment in the series is correctly aligned with the end face of the juxtaposed end face of the next adjacent coupling segment, the entire assembly of coupling segments each lying in closely parallel relation to the X–Y plane, and, perpendicular to the Z axis, thus, perpendicular to the longitudinal axis of the associated pipe.

Having arrived at this desirable condition, it is merely a matter of the workman then torquing the respective bolts down by the recommended amount, this then ensuring that the teeth of each of the coupling segments are engaged with substantially equal force with the associated side wall of the pipe groove.

Final torquing down of the traction bolts will result in a greatly increased compressive force being applied to the end faces 34 of the respective stop members 30–32, and this being accompanied by a slight lateral shift in opposite directions of the respective stop members 30–32. This will cause crushing down of the end faces 34 either by direct compressive force, or, by attrition resulting from the lateral shift between the respective end faces, the extent of crushing down and abrasion being substantially identical at the end faces of each of the stop members 30 and 32 of the respective coupling segments.

Thus, by following the teachings of the present invention, it firstly is assured that a pair of couplings segments if pre-assembled to each other prior to their assembly onto the pipes are positioned in correct relation relative to the X–Y plane, and, that any lateral shifting between the mutually presented ends of those coupling segments has been restricted to an extent that insures that the keys of the respective coupling segments are in a position for them to be received within the pipe grooves.

It is further assured that, whether a pair of coupling segments is first preassembled to each other and then applied to the pipe periphery, or, the respective coupling segments are applied to the pipe periphery and then secured to each other, that the extent of relative lateral shifting of the coupling segments is restricted to a predictable position.

Having eliminated the source of mis-alignment of the first pair of coupling segments, the progression can then be continued, without the fear of cumulative mis-alignment, while at the same time insuring that the coupling segments each extend substantially in the X–Z plane and truly perpendicular to the Z—Z axis, and thus, the longitudinal axis of the pipe.

Upon final torquing down of the traction bolts, the respective keys then approach the associated side walls of the pipe grooves to effect the required clamping action on the side walls of the pipe grooves, this in turn ensuring that each and every one of the keys is properly engaged with the side walls of the pipe grooves, and, that any spacing of an adjacent pair of end faces 16a and 16b of the respective coupling segments is precluded, thus to provide a truly ridged coupling that will prevent any angling movements of the respective axes of the respective pipes.

What is claimed is:

1. A coupling segment for a segment pipe coupling, including an arcuate body configured to compressively retain a sealing gasket in sealing engagement with adjacent ends of pipes, and which includes oppositely inclined end faces at respective opposite ends of said arcuate body, further including:

at least one stop member at each said respective opposite ends of said arcuate body, said stop members being configured to limit the initial extent of movement of a said end along a Y—Y axis of the coupling segment relative to a juxtaposed end of another said coupling segment;

said stop members each being comprised of a member cast integrally with said arcuate body;

at least one end of each said stop member being in an unfinished as-cast condition and at least initially presenting a rough surface capable of crushing down to a limited extent under an applied compressive force after contacting a corresponding rough surface of a stop member of said juxtaposed end of another said coupling segment, resistance to said crushing down increasing as said rough surface and said corresponding rough surface move toward each other under said applied compressive force, thereby limiting the further movement of said end of said arcuate body along the Y—Y axis of the coupling segment relative to said juxtaposed end of another said coupling segment.

2. The coupling segment according to claim 1, in which said stop members each provide a surface lying in an X–Z plane of the coupling segment.

3. The coupling segment of claim 1, in which said stop members each provide a surface extending parallel to an X–Z plane of said coupling segment.

4. The coupling segment of claim 1, in which said stop members provide a surface extending parallel to an X—X axis of the coupling segment, and which is inclined relative to an X–Z plane of the coupling segment.

5. The coupling segment of claim 1, including dual said stop members at each said respective ends of said arcuate body, said stop members being positioned respectively adjacent to opposite side edges of said coupling segment.

6. The coupling segment of claim 1, in combination with at least one additional said coupling segment, to provide a segmented pipe coupling.

7. The coupling segment of claim 6, in which said stop members are operative to limit lateral sliding movement of said respective end faces of said respective coupling segments, crushing down of said end faces of said stop members under compressive loading permitting limited further relative lateral movement of said ends of said respective coupling segments.

* * * * *